United States Patent Office

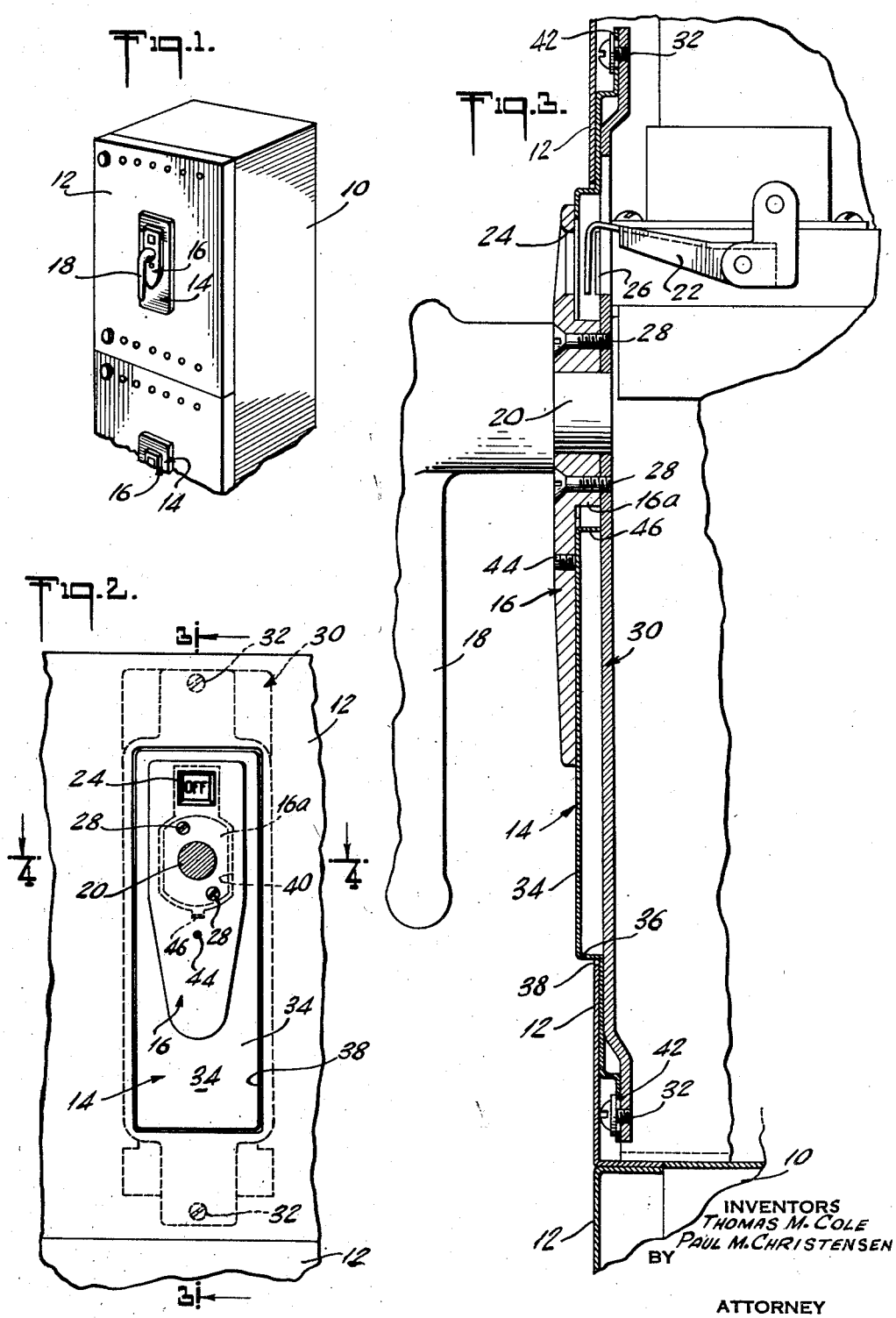

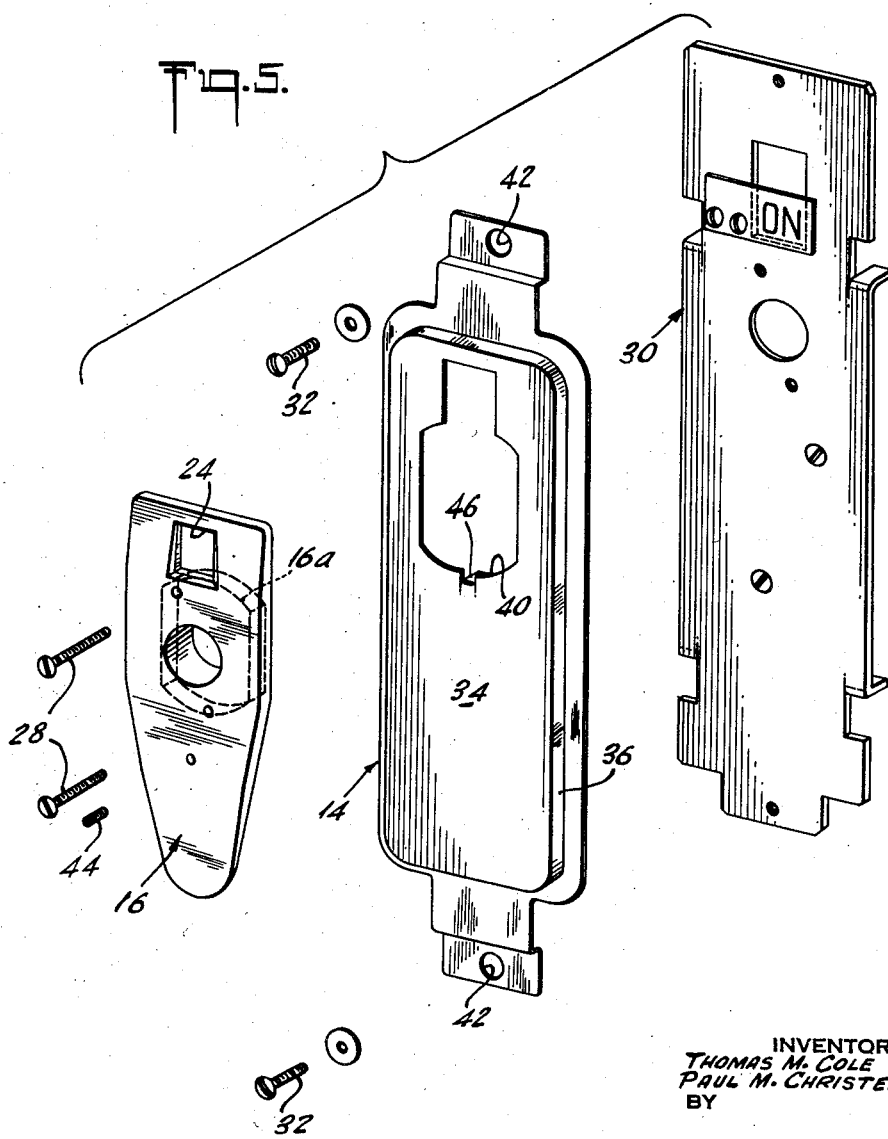

2,776,355
Patented Jan. 1, 1957

2,776,355

FACE PLATE AND DEAD FRONT SWITCHES

Thomas M. Cole, Harrison, N. Y., and Paul M. Christensen, West Orange, N. J., assignors to Federal Pacific Electric Company, a corporation of Delaware Application April 14, 1955, Serial No. 501,383

18 Claims. (Cl. 200—168)

The present invention relates to enclosed switchgear. Such apparatus commonly includes an enclosure with a front panel, and a switch mechanism that is contained within the enclosure but which has an operating handle projecting in front of the panel. The switchgear also has a signal, indicating whether it is "on" or "off" and this signal is displayed through a suitable window.

Because of inevitable manufacturing tolerances, it is impractical to depend on locating the switchgear in the enclosure as precisely as the projecting portion of the switchgear is to be centered in the opening in the front panel of the enclosure.

The present invention has as an object the provision of an arrangement satisfying these conflicting conditions, permitting comparatively wide variations in the positioning of a switch, circuit breaker or the like within an enclosure, while enabling a projecting portion of the contained switchgear to neatly fit an opening in a non-adjustable panel of the enclosure.

A further aspect of the invention enables a signal carried by the switchgear to be neatly displayed through a window, while at the same time accommodating a comparatively broad latitude of error in the relative positioning of the switchgear and the apertured panel through which the signal is displayed.

The signal and the operating handle are carried by the switchgear, in the embodiment of the invention detailed below, with a two-part face-plate assembly that fills the opening in the front panel of the enclosure. The arrangement simulates a unitary construction of the panel and the switchgear, with the result that there is a really neat appearance, but there are no gaps through which tampering devices might be inserted. The two part face-plate assembly includes a first face-plate that is rigidly assembled to the switchgear. This face-plate forms a bearing for the operating handle and embodies a window for accurately framing a signal also carried by the switchgear. This assembly also carries a second, larger face-plate slideably retained behind a flange portion of the first face-plate. The second face-plate has a raised area whose size and shape are neatly receivable in an opening in the front panel or door of the enclosure, and its adjustable mounting makes it alignable with that opening even where there is error in the positioning of the switchgear in relation to the door or panel that is to close over the switchgear. The second face-plate has an area that is raised to extend forward of the enclosure panel, through the opening in that panel.

For orderly assembly of this apparatus, to complete its neat finished appearance, the adjustable face-plate is fixed to the switchgear frame by screws that are concealed by the enclosure panel. Since the screws are concealed, they are also inaccessible for tightening unless the panel is removed. But when the panel is removed there is no saying where the opening in the panel will be when the panel is later put into place. This dilemma is solved by providing a detent that is accessible with the panel closed. This detent is small and inconspicuous and is relied on for temporarily holding the adjustable face-plate in position with the raised area thereof neatly fitted in the opening in the panel. Thereafter the panel can be removed, and the concealed screws or the like can be used for finally securing the temporarily adjusted face-plate.

The face-plate assembly can always be readjusted when necessary; but once adjusted, it stays in place without dependence on the panel or enclosure door remaining closed. The panel can be removed from time to time for inspection and servicing of the enclosed switchgear, without loss of adjustment of the face-plate assembly.

The nature of the invention will be more fully appreciated, and further features of novelty and advantages will be apparent, from the following detailed disclosure including the annexed drawings forming a part of this disclosure. In the drawings:

Fig. 1 is an external small-scale perspective view of an embodiment of the invention;

Fig. 2 is a fragmentary front view of the embodiment of the Fig. 1 with the operating handle removed;

Fig. 3 is a vertical cross-section of the apparatus of Fig. 2 along the line 3—3, drawn to larger scale;

Fig. 4 is a fragmentary cross-section of the embodiment in Fig. 2 along the line 4—4; and Fig. 5 is an exploded perspective of certain portions of the illustrated embodiment of the invention in the other views.

Referring now to Fig. 1 there is shown an enclosed circuit breaker of the general type in the Wills application Serial No. 329,165, filed January 2, 1953, including a casing 10 and a door 12 which is pivoted at the left hand edge (although the door or a like panel may be secured in place in any other convenient manner). Extending through a rectangular opening in door 12 is a face-plate 14, and another face-plate 16 is disposed with a flange portion against the front of face-plate 14. A pivoted operating handle 18 for the circuit breaker contained in enclosure 10, 12 also appears in Fig. 1. A number of such enclosed switchgear units are ordinarily stacked and many of them may be arranged side by side in a dead-front control center.

Handle 18 is secured to a shaft 20 as seen in Figs. 2, 3, and 4, which shaft operates circuit breaker mechanism omitted from the drawings because the details thereof are unnecessary to an understanding of the present invention.

A mechanical connection, not shown, from the handle and shaft, operates a pivoted flag 22 so as to lower a sign "Off" behind a window 24 in plate 16 when the circuit breaker is off, and to raise that flag so as to display a stationary flag 26 when the circuit breaker is "On." This signal device is displayed through the door or panel 12.

Flanged plate 16, against which handle 18 bears and in which shaft 20 has a bearing 16a, is secured by a pair of screws 28 to a frame plate 30 forming part of the circuit breaker. Plate 16 thus constitutes a portion of the circuit breaker that projects forward of panel 12. Frame plate 30, shaft 20, signals 22 and 26, and handle 18, all form part of a circuit breaker which is installed within the enclosure, usually on rails so as to be readily removable for inspection, or service replacement. Its positioning is naturally susceptible to a certain latitude of error and therefore the position that it would assume in relation to any hole provided in panel or door 12 would be a matter of considerable variation, from each unit to the next. The anticipated error is not only in the vertical and horizontal directions, but also there is likely to be a certain amount of front-to-rear variation in the position of the whole circuit breaker, including frame plate 30. It is desirable to fill such space, both for neatness of workmanship and to block tampering tools from being inserted between door 12 and the circuit breaker mechanism within the enclosure. For these purposes a face-plate 14 is provided. This face-plate is secured to frame member 30 by a pair of screws 32, and is formed with a flat area 34 raised by a short wall portion 36 to extend through the hole or opening 38 in door 12. This door may be located as closely against the circuit breaker plate 30 as shown, or it may be spaced some short distance away from that circuit breaker; but in any event the wall surface 36 can be large enough to project area 34 through opening 38 to accommodate reasonable front-to-rear variations in the position of the enclosed switchgear.

It has been noted that the circuit breaker is susceptible to horizontal and vertical variation in its positioning, relative to the opening in the panel or door 12. For this reason provision is made for adjusting face-plate 14 in both directions so that raised area 34 is snugly received in opening 38 of door 12. Face-plate 14 has a hole 40 that is more than large enough to receive support and bushing portion 16a of the face-plate 16, and it is also formed with an adequately large opening so that window 24 will not be obstructed, regardless of the adjustment of face plate 14. Holes 42 in plate 14, which admit screws 32, are also made adequately large to allow for this adjustment; but the heads of the screws, supplemented by washers, hold plate 14 securely in any position of adjustment. Face plate 14 can then be adjusted horizontally and vertically to a limited extent, as may be required to locate area 34 properly for alignment with opening 38 in the door 12. After face plate 14 has been properly adjusted, screws 32 are tightened and the face plate is fixed in position. The flange portion of face plate 16 that overlies face plate 14 is large enough to cover hole 40 in all positions of adjustment of plate 14.

The adjustment of face plate 14 could be a tedious trial-and-error procedure. This is because screws 32 are concealed from view by door 12 and they are correspondingly concealed from access for tightening them when the door is closed.

A set screw 44 is provided in plate 16 for fixing face plate 14 in temporary adjustment with door 12 closed. A lug 46 is formed in face plate 14 adjacent set screw 44, to stiffen plate 14 against the thrust of screw 44. Set screw 44 is located inconspicuously at a point behind the downwardly extending portion of handle 18 and, small as set screw 44 is in practice, it is furthermore concealed from view by this depending handle.

The construction is adjusted as follows. A circuit breaker with handle 18, fixed face plate 16, loosely supported face plate 14 and fixed member 30 are placed within enclosure 10, in operating position. Door 12 is then closed, carefully shifting face plate 14 manually so that it is properly centered in hole 38 of the door, while screws 32 are all loose. Enlarged holes 42 afford the necessary latitude of adjustment required. Screw 44 is then tightened, so that face-plate 14 will stay in adjusted position temporarily, even though it is released from hand-held adjustment. The door is next opened and screws 32 are tightened; and the door is closed, with face-plate 14 securely held in the desired position, centered in opening 38 of the door.

It is seen that transverse wall portion 36 which surrounds the raised portion 34 of face-plate 14 accommodates a latitude of fore-and-aft variation in the positioning of the circuit breaker enclosed within the enclosure 10, 12. The externally accessible detent represented by set screw 44 enables temporary locking of the face-plate in the desired position, centered within the door opening, without exposing screws 32 to access and to view from the exterior when the door is closed. The door may thereafter be opened as often as necessary for inspection and service of the enclosed switchgear, without loss of adjustment of the face-plate. Even though there may be no possibility of adjusting the doors or front panels, each enclosed circuit breaker carries with it a readily adjustable face-plate assembly that completes the front closure.

Having thus described a particular embodiment of our invention, and explained the principles thereof, what we claim is:

1. Enclosed switchgear, including an enclosure having a panel with an opening therein, switchgear contained in said enclosure and having a portion projecting forward of said panel through said opening, said switchgear embodying a device operative through said panel, and a face-plate assembly substantially occupying the opening in said panel, said assembly including a first face-plate fixed to said switchgear and having a flange portion forward of said panel, and a second face-plate slideably mounted behind said flange portion, said first face-plate having an opening aligned with said device and said second face-plate having a larger opening for said device and aligned with said panel opening, and means securing said second face-plate in said aligned position on said switchgear.

2. Enclosed switchgear, including an enclosure including a panel with an opening therein, switchgear contained in said enclosure and having a portion operative at said opening, a face-plate assembly carried by the enclosed switchgear and disposed to project through said opening and to substantially fill said opening despite variations in the relative positioning of said panel and said switchgear, said assembly including a first face-plate substantially smaller than said opening and having a flange portion forward of said panel and having a support fixed to said switchgear, said assembly also including a second face-plate having a raised area substantially filling the opening in said panel and being adjustably slideable against the back surface of said flange portion of said first face-plate, said second face-plate having an opening penetrated by the support of said first face-plate.

3. Enclosed switchgear, including an enclosure having a front panel formed with an opening, switchgear contained in said enclosure and having an operating handle extending forward of said panel through said opening, a composite face-plate assembly substantially filling the space between said operating handle and said panel opening, said assembly including a first face-plate embodying a flange portion forward of said panel and a support extending through said opening and secured to said switchgear, and a second face-plate adjustably secured to said switchgear and slideable against the rear of said flange portion during its adjustment, said second face-plate having an opening adequately large to permit such adjustment with the support of the first face-plate extending therethrough.

4. Enclosed switchgear, including an enclosure having a front panel formed with an opening, switchgear contained in said enclosure and having an operating handle extending forward of said panel through said opening, a composite face-plate assembly substantially filling the space between said operating handle and said panel opening, said assembly including a first face-plate embodying a flange portion forward of said panel and a support extending through said opening and secured to said switchgear, and a second face-plate adjustably secured to said switchgear and slideable against the rear of said flange portion during its adjustment, said second face-plate having an opening adequately large to permit such adjustment with the support of the first face-plate extending therethrough, said second face-plate having a forward-projecting area projecting through said panel opening, said area being of substantially the same shape but slightly smaller than said panel opening.

5. Enclosed switchgear, including an enclosure having a panel formed with an opening, switchgear contained in said enclosure and having a signal effective through said opening, said switchgear including a face-plate assembly embodying a window accurately framing said signal, and a closure at said panel opening, said assembly including a first face-plate having a flange portion embodying said window and having a support fixing said face-plate to said switchgear with the window in proper relation to said signal, and a second face-plate having means for adjustably securing it to said switchgear, said second face-plate having a raised portion substantially occupying said opening and projecting therethrough and said raised portion being slideable during adjustment thereof against the rear surface of said flange portion, said second face-plate being apertured to accommodate said support and to display said signal despite a latitude of adjustment of that second face-plate.

6. Enclosed switchgear, including an enclosure having a panel formed with an opening, switchgear contained in said enclosure including an operating handle and a signal operative through said panel opening and said handle projecting forward of said panel, a composite face-plate assembly embodying a first face-plate forming a window for said signal and a bearing for said operating handle, said first face-plate having a support fixing it to said switch-gear and having a flange disposed forward of said panel, and a second face-plate having a raised portion substantially filling said panel opening and in slideable contact with the rear of the flange of said first face-plate.

7. Enclosed switchgear, including an enclosure having a front panel formed with an opening, switchgear contained in said enclosure and having an operating handle extending through said opening and having a manually engageable portion outside said enclosure, a face-plate assembly carried by said switchgear and substantially filling said panel opening, said face-plate assembly including a first face-plate having a flange portion disposed in front of said panel and having a bearing portion for said operating handle extending through said opening and secured to said switchgear, and a second face-plate having a raised area in slideable engagement with the back of said flange portion, said raised portion substantially filling said panel opening, said second face-plate having securing means adjustably fastening it to said switchgear, said securing means being accessible only with said panel removed.

8. Enclosed switchgear, including an enclosure having a front panel formed with an opening, switchgear contained in said enclosure and having an operating handle extending through said opening and having a manually engageable portion outside said enclosure, a face-plate assembly carried by said switchgear and filling said panel opening, said face-plate assembly including a first face-plate having a flange portion disposed in front of said panel and having a bearing portion for said operating handle extending through said opening and secured to said switchgear, and a second face-plate having a raised area in slideable engagement with the back of said flange portion, said raised portion substantially filling said panel opening, said second face-plate having securing means adjustably fastening it to said switchgear, said securing means being accessible with said panel removed, and inconspicuous detent means between said face plates accessible with said panel in switchgear-enclosing position.

9. Switchgear including an operating handle having a combined bearing member and face-plate including a flange portion, a second face-plate of greater lateral extent than said first face-plate slideable against the back of said flange portion and having adjustable means for securing it to the switchgear.

10. Switchgear including an operating handle having a combined bearing member and face-plate including a flange portion, a second face-plate of greater lateral extent than said first face-plate slideable against the back of said flange portion and having adjustable means for securing it to the switchgear, said face-plates additionally having inconspicuous means accessible from the front of said first face-plate for securing said face-plates temporarily in fixed relative adjustment.

11. Enclosed switchgear including an enclosure having a panel formed with an opening, switchgear in said enclosure and having a device operative through said opening, and a face-plate assembly including a first face-plate secured to said switchgear and in critical position relative to said device and a second face-plate having a portion projecting through said opening against the rear of said first face-plate and adjustably secured to said switchgear.

12. Switchgear including an operating handle, a bearing member for said operating handle having a flange portion, a frame member, said bearing member being secured to said frame member, and a face-plate slideably adjustable between said frame member and said flange portion and having securing means for fixing it in adjusted position relative to said bearing member.

13. Switchgear including an operating handle, a bearing member for said operating handle having a flange portion, a frame member, said bearing member being secured to said frame member and a face-plate slideable between said frame member and said flange portion and having securing means for fixing it in adjusted position relative to said bearing member, said securing means including an inconspicuous detent between said bearing member and said adjustable face-plate, and prominent securing means between said adjustable face-plate and said frame member.

14. Enclosed switchgear including an enclosure having a front panel formed with an opening, switchgear contained in said enclosure, a first face-plate carried by said switchgear and having a flange portion disposed forward of said panel, said face-plate having a support extending through said opening, a frame member disposed behind said panel, and a second face-plate slideably confined between said flange portion and said frame member and having a raised area extending through and substantially filling said panel opening.

15. Enclosed switchgear including an enclosure having a front panel formed with an opening, switchgear contained in said enclosure, a first face-plate carried by said switchgear and having a flange portion disposed forward of said panel, said first face-plate having a support extending through said opening, a frame member disposed behind said panel, and a second face-plate slideably confined between said flange portion and said frame member and having a raised area extending through and filling said panel opening, securing means for said adjustable face-plate behind said panel, and an inconspicuous detent engageable from in front of said panel for holding said face-plate in temporary adjustment prior to fixing said face-plate in position by means of said first mentioned securing means.

16. Enclosed switchgear, including an enclosure having a front panel formed with an opening, a switchgear in said enclosure and having an externally accessible member, a plate having a raised area projecting through said panel opening and said raised area being formed with an aperture through which said member extends and said plate having a peripheral flange portion behind said panel about the opening therein, said plate having a laterally adjustable supporting means on the switchgear for centering the raised area of the plate in the panel opening despite a range of possible relative positions between the enclosure and the switchgear, and said externally accessible member having a rear face extending across part of said plate about the aperture therein, said aperture being substantially larger than the part of said member extending therethrough, and said rear face of said member being sufficiently larger than said aperture to conceal the aperture in all adjusted positions of said plate.

17. Switchgear to be contained in an enclosure having a front panel formed with an opening through which the switchgear may extend for access, said switchgear having an externally accessible member, a face-plate having a raised area adapted to project through the opening in the front panel of an enclosure and formed with an aperture through which said member extends and said face-plate having a rearward peripheral portion adapted to lie behind the enclosure panel and to extend about the panel opening, said face-plate having laterally adjustable supporting means on the switchgear for centering the raised area of the face-plate in a panel opening despite a range of possible relative positions of the switchgear in an enclosure, and said externally accessible member having a rear face extending over part of the face-plate about the aperture therein, said aperture being substantially larger than the portion of said member extending therethrough, and said rear face of said member being sufficiently larger than said aperture to conceal the aperture in all adjusted positions of said face-plate.

18. Enclosed switchgear including an enclosure having a front panel formed with an opening, switchgear contained in said enclosure, a first member carried by said switchgear and having a rear face disposed forward of said panel, said member having a support extending through said opening, a frame member having a peripheral portion disposed behind said panel and having a raised area within said peripheral portion extending through and substantially filling said panel opening, said raised area being in substantially face-to-face contact with said rear face of said first member, said frame member having an aperture penetrated by the support of said first member with clearance allowing lateral adjustment of said frame member relative to said first member and said rear face of said first member covering the portion of said raised area adjacent to said aperture in said frame member to conceal said aperture in all adjusted positions of said frame member.

No references cited.